H. S. DUBE.
TIRE COVER.
APPLICATION FILED OCT. 16, 1920.
1,398,259.
Patented Nov. 29, 1921.
3 SHEETS—SHEET 1.
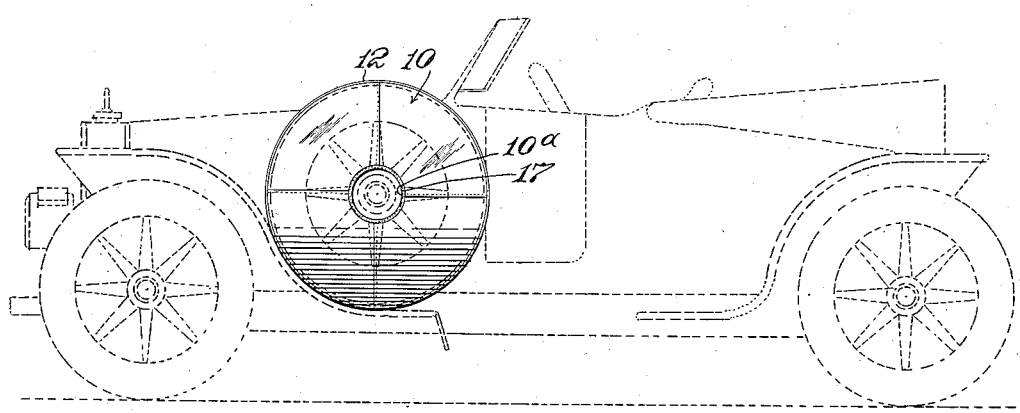
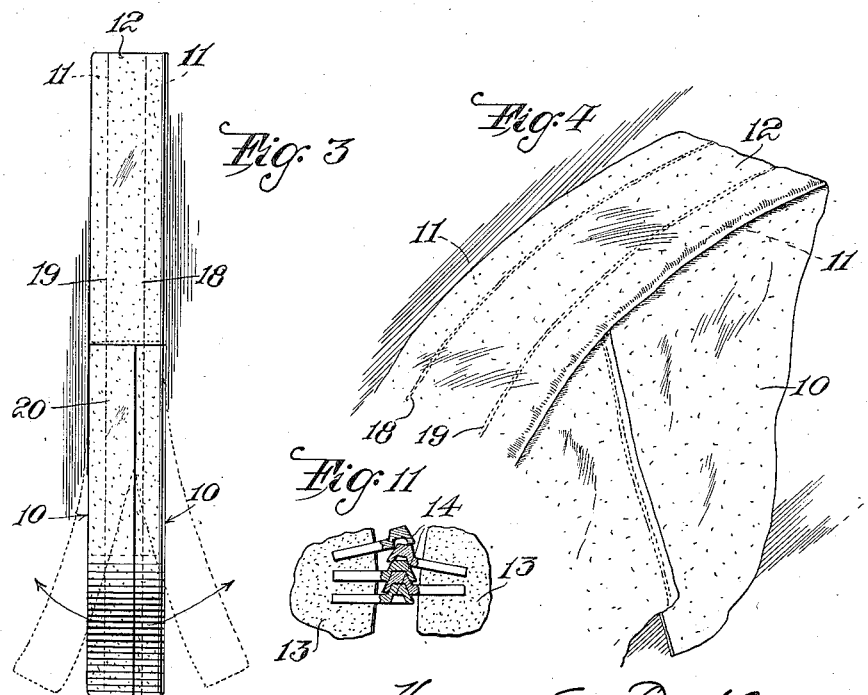
Harry S. Dube
INVENTOR.
BY
Louis S. Gottlieb
ATTORNEY.

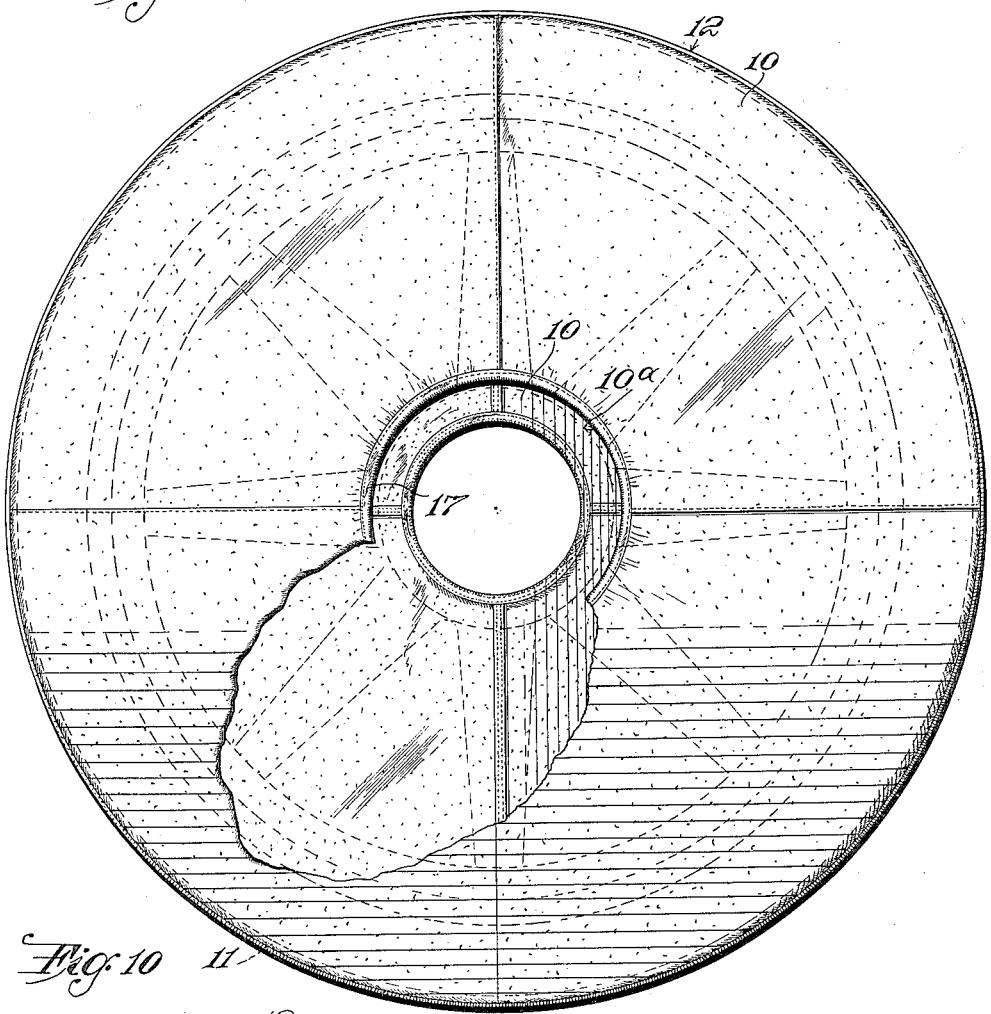
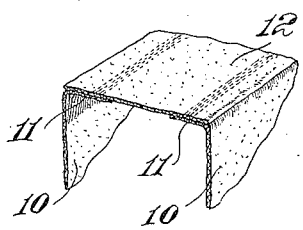

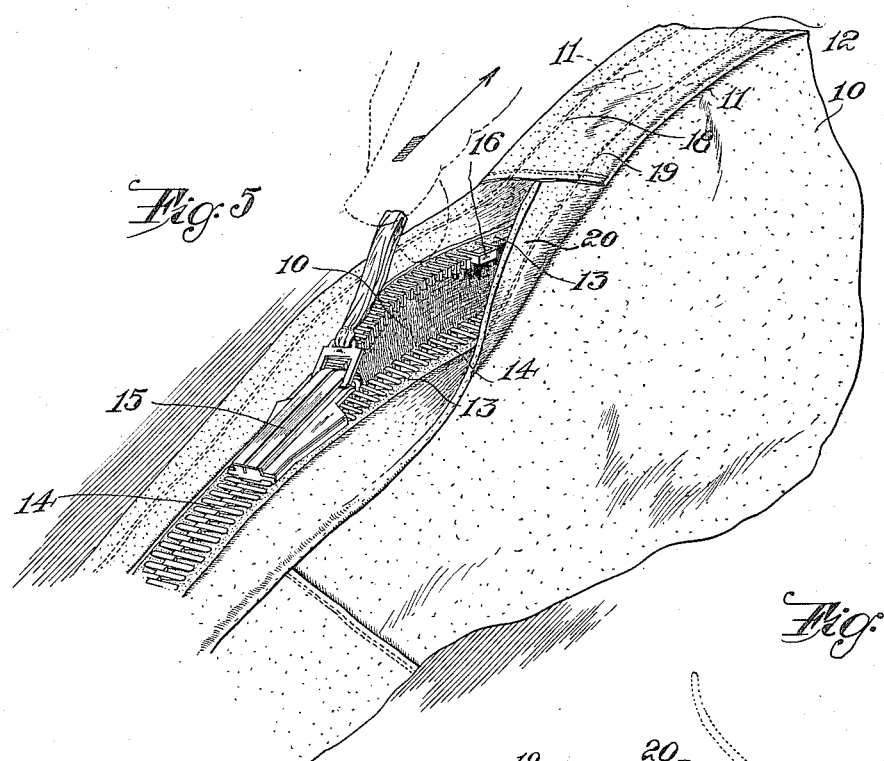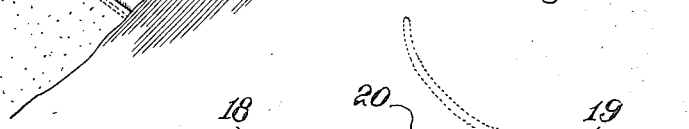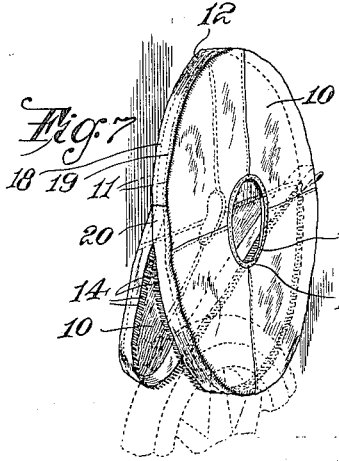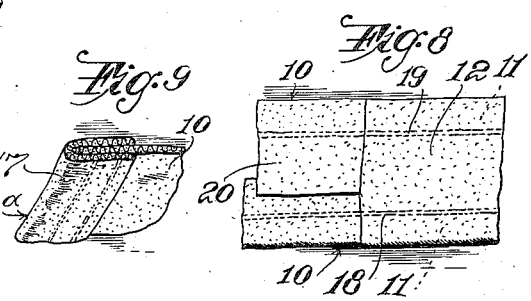

UNITED STATES PATENT OFFICE.

HARRY S. DUBE, OF NEW YORK, N. Y.

TIRE-COVER.

1,398,259. Specification of Letters Patent. Patented Nov. 29, 1921.

Application filed October 16, 1920. Serial No. 417,400.

*To all whom it may concern:*

Be it known that I, HARRY S. DUBE, a citizen of the United States of America, residing at New York, in the county of New York and State of New York, have invented certain new and useful Improvements in Tire-Covers, of which the following is a specification.

My present invention relates generally to tire covers and among its objects my invention aims to provide a cover for the spare tires of automobiles and motor cars, by means of which a tire and the rim as well as the wheel upon which the tire may be mounted will be covered and protected from the sun, dust and water.

A further object is the provision of a tire cover in connection with which a tire with its rim and wheel may be readily inserted and removed as well as one which will be continuously secured in the closed position while avoiding the necessity of buttons, clasps and other displaceable unsightly fasteners.

A still further object is the provision of a tire cover, the fastening means of which will be concealed and protected in the closed position and are such as to permit the incased tire to be placed either within a rack or upon the spindle.
In the accompanying drawings which illustrate my present invention and form a part of this specification, Figure 1 is a side view illustrating the practical application of my invention, Fig. 2 is an enlarged side view of my improved cover partly broken away, Fig. 3 is an edge view, Fig. 4 is a partial perspective view looking at the permanently closed portion of the cover, Fig. 5 is an enlarged partial perspective view looking at the open portion of the cover with its fastening means, Fig. 6 is a cross section through a portion of Fig. 5, Fig. 7 is a perspective view with the cover open, Fig. 8 is a partial plan view, Fig. 9 is a detail sectional perspective view taken adjacent to the center of the cover, Fig. 10 is a cross section taken through Fig. 4, and Fig. 11 is a detail longitudinal section through a portion of the closure means.
Referring now to these figures my invention proposes a cover including side walls
10, each of which is preferably, although not necessarily, formed of triangular segments the edges of which are stitched along radial lines, and each of which side walls may be either entirely closed at its center, as where the cover is used in connection with a tire and its rim alone, or may be provided with central openngs 11 receiving the hub of a wheel where the tire and rim are secured upon a spare wheel and the latter carried upon a spindle attached as in many instances to an automobile or motor car.

Irrespective of their particular formation in the instances previously noted, the side walls 10, which are preferably formed of flexible material throughout, have inturned flanges around their outer peripheral edges, and to these flanges for approximately one half or preferably slightly less than one half, of the circumference of the side walls is stitched or otherwise permanently fastened a permanent peripheral closure strip 12.

Between the opposite ends of the peripheral strip 12, which thus gives the tire cover as a whole substantially cylindrical form, the remaining portion of its circumference, that is approximately one half of its circumference and preferably slightly greater than one half, is open, the flanges 11 of the side walls 10 receiving along the open portion stringers 13 the inner edges of the latter of which are equipped with continuous series of interlocking levers or fingers 14 and are engaged by a slide 15 whose movement in relatively opposite directions tends to respectively interlock and release the levers or fingers 14 whose action is to be plainly seen by reference to Figs. 5, 6 and 11.

The slide 15 is manually shiftable as seen in Fig. 5, stops 16 being located at opposite ends of the series of interlocking fingers or levers 14 so as to arrest the slide when the cover is opened and closed.

In the open position, the cover being split for approximately one half of its circumference as indicated in Fig. 7, it becomes an easy matter to insert and remove a tire either with its rim only or in position upon a wheel. In the latter instance the openings 10ª at the center of the side walls 10 receive the opposite ends of the wheel hub, being preferably reinforced by reinforcing strips 17 embracing the inner edges of the side walls around their openings, as seen in Figs. 7 and 9.

Along the flanges 11 of the side walls, between the ends of the permanent peripheral closing strip 12, are also secured cover strips 18 and 19 overlying the stringers 13, and of these cover strips, the strip 19 has an inwardly extending portion 20 which is free to overlie the two series of interlocking fingers or levers 14 and the locking and releasing slide 15 so as to conceal and protect the fastening means in the closed position.

The cover as a whole being thus of practically unbroken formation and having its fastening means concealed in the closed position, lends itself readily to a finish, embellishment or decoration corresponding to that of the automobile or motor car with which it is used, and thus adds to the beauty of the car rather than detracting therefrom as is ordinarily the case.

By virtue of the particular closure means extending continuously along the open portion of the cover I avoid the use of buttons, clasps and other exposed and more or less readily displaceable fasteners and I obtain at the same time a complete closure of the cover which will result in protecting a tire, rim and wheel from the deteriorating influence of sun, dust, dirt and water.

It is furthermore to be observed that by virtue of completely covering the tire and rim and the use of a protected non-protruding fastening device I provide for the ready insertion of the covered tire, rim and wheel within a rack or upon a spindle so that it is thus adaptable to the tire holding means of various types now in common use.

With the cover in the open position shown in Fig. 7 it becomes a simple matter to draw the same over a tire and rim either with or without a wheel and when drawn thereover it is simply necessary to manually pull the slide 15 from one end of the permanent peripheral closing strip 12 to the other end in order to cause the series of fingers or levers 14 to interlock. This is done with the protecting flap flexed away from the slide so that at the end of effective movement of the latter the flap may upon release assume the position shown in full lines in Fig. 6 and completely conceal the fastening means from view. The reverse is true of the opening movement and it thus becomes evident that in addition to its other advantages my improved cover is capable of ready insertion in and removal from effective position.

I claim:

A tire cover consisting of a pair of spaced apart circular side walls, a permanent peripheral strip secured along the outer edges of said side walls for approximately one half the circumference thereof, stringers secured along the remaining portions of the peripheral edges of said side walls between the ends of said permanent strip, and having series of interlockingly engageable fingers, a slide for interlocking and releasing said fingers, movable along the stringers, and cover strips secured to overlie the said stringers, one of which has an inwardly projecting flap normally covering the series of interlocking fingers and the slide.

In testimony whereof I have affixed my signature.

HARRY S. DUBE.